United States Patent [19]

Faircloth, Jr.

[11] 4,375,340

[45] Mar. 1, 1983

[54] CARBON ELECTRODE JOINT

[75] Inventor: James M. Faircloth, Jr., Morganton, N.C.

[73] Assignee: Great Lakes Carbon Corporation, New York, N.Y.

[21] Appl. No.: 132,633

[22] Filed: Mar. 21, 1980

[51] Int. Cl.³ .................. F16B 12/36; F16B 13/00; F16B 7/18

[52] U.S. Cl. .................. 403/296; 403/DIG. 5; 373/82

[58] Field of Search ............... 403/296, DIG. 5, 292, 403/406; 13/18; 314/60

[56] References Cited

U.S. PATENT DOCUMENTS 3,612,586 10/1971 Stieber .................. 403/DIG. 5
4,152,533 5/1979 Gazda .................. 13/18 C
4,159,184 6/1979 Burwell .................. 403/2
4,167,643 9/1979 Charnock .................. 13/18 C

FOREIGN PATENT DOCUMENTS 1076845 3/1960 Fed. Rep. of Germany ... 403/DIG. 5
2657952 2/1979 Fed. Rep. of Germany .
1381377 1/1975 United Kingdom ......... 403/DIG. 5

*Primary Examiner*—Wayne L. Shedd
*Attorney, Agent, or Firm*—R. Laddie Taylor

[57] ABSTRACT

Thread material is removed from the non-load bearing flank of a selected number of threads on each side of the center thread of a nipple to provide increased strength for an electrode joint formed therewith.

3 Claims, 7 Drawing Figures

CARBON ELECTRODE JOINT

BACKGROUND OF THE INVENTION

1. Field of the Invention

This invention relates to improved joints for connecting carbon electrodes to provide electrode columns for use in electric furnaces or like equipment, and to nipples for forming such joints, the term "carbon" as used herein being generally inclusive of the graphite form of carbon.

Conventionally, an electrode joint comprises two coaxially aligned carbon electrode sections having threaded sockets in their butt faces and a correspondingly threaded nipple joining the electrode sections in abutting relationship. Such joint permits continuous electrical operation of an apparatus utilizing electrodes by providing means for attaching new electrode material to the end of an electrode column as the column is consumed.

The thread depth of the nipple utilized in this joint is generally uniform over its entire length, with each thread having a load-bearing flank that carries the force between the nipple and the electrode sections, and a non-load bearing flank on the opposite side thereof. The non-load bearing flank of the nipple is the thread flank opposite the flank which is closer to the plane defined by the abutting electrode sections.

A serious problem encountered with conventional electrode joints is that they are susceptible to failure during use, this failure resulting from breakage due to splits and cracks produced by stresses caused by flexural strain and thermal gradients experienced by the joint when it is being fed into an operating electric furnace. The difference between the coefficient of thermal expansion of the electrode sections and the nipple also leads to stresses within the electrode joint. Further, the high current loading of modern electric furnaces frequently causes additional joint stresses due to overheating of the nipple portion at the junction between the nipple and the electrode sockets.

It is known that failures of electrode joints, which result from the stresses are strains discussed above, are principally localized at or near the first engaged nipple threads near midlength of the nipple or at the first engaged socket threads in the base of the socket.

2. Description of the Prior Art

It has long been recognized that a modification of the conventional electrode joint design was necessary to eliminate failure due to breakage during use. Various methods have been proposed by those skilled in the art to prevent failure by alteration of the joint at or near the midlength of the nipple.

U.S. Pat. No. 3,612,586-Stieber et al. provides a modification for an electrode joint comprising: (a) inactivation of the threads of the socket of the upper electrode section directly adjacent the joint face; (b) inactivation of the nipple threads directly adjacent the upper electrode section end face; or (c) both of these. This reference, while providing some reduction of the stresses at the area of the electrode joint at the first engaged nipple threads at the midpoint of the nipple, does not provide means for distributing the stresses amongst the engaged threads of the joint near this location.

The present invention provides means for modifying the nipple of an electrode joint near the midpoint thereof so as to equally distribute thermally and mechanically induced pressures, thus equalizing or distributing the failure-causing stresses and strains over a large portion of the nipple, thereby providing increased electrode-nipple joint strength.

SUMMARY OF THE INVENTION

It is an object of this invention to provide an electrode joint wherein the stresses focused at or near the first engaged nipple threads near midlength of the nipple are relieved, thus increasing the strength of the joint.

It is a further object of the invention to provide an electrode joint which is highly resistant to breakage during use.

It is a still further object of this invention to provide a nipple having a novel thread design for use in such a joint.

These and other objects of the invention are accomplished by providing a carbon electrode joint comprising two coaxially aligned carbon electrode sections, each electrode section having a threaded nipple joining the electrode sections in abutting relationship, the improvement which comprises having an effective amount of material removed from only the non-load bearing flank, as hereinbefore defined, of the first thread or first few threads on each side of the center thread of the nipple sufficient to increase electrode joint strength, by means of relieving the flexural and thermal stresses thereat.

While the novel nipple modification disclosed herein improves the strength of an electrode joint utilizing a straight nipple, the invention is particularly effective for improving the strength of an electrode joint comprising a tapered nipple and correspondingly tapered sockets.

BRIEF DESCRIPTION OF THE DRAWINGS

The invention will become more apparent when described in conjunction with the drawings, in which like reference numerals designate like parts in the several views, and wherein.

DETAILED DESCRIPTION OF THE DRAWINGS

Figure 1:
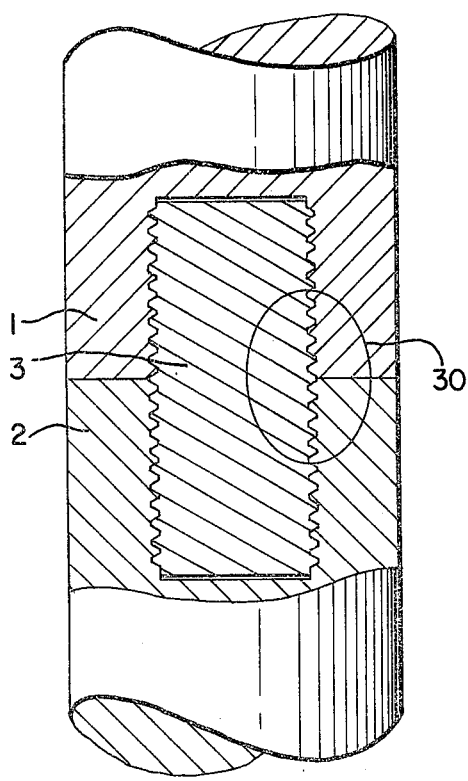
FIG. 1 is a vertical section view of a conventional carbon electrode joint (prior art).
Figure 2:
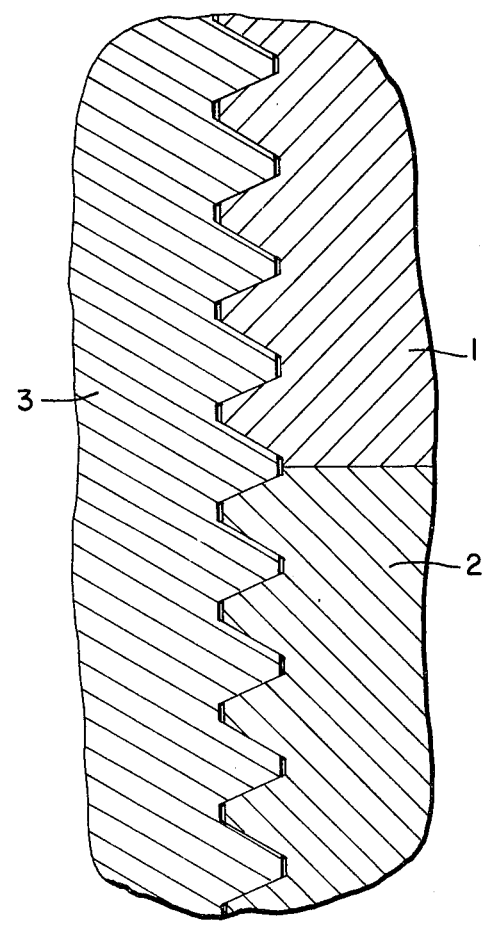
FIG. 2 is an enlarged view of Section 30 in FIG. 1.

A conventional carbon electrode joint illustrated in FIG. 1 comprises two coaxially aligned carbon electrode sections 1 and 2, each electrode section having a threaded socket in its butt face and joined by correspondingly threaded nipple 3. When this type of electrode joint is exposed to stresses caused by flexural strain and thermal gradients resulting from high temperature environments such as operating electric furnaces, it is very susceptible to failure, the failure being localized principally near the first engaged nipple threads near midlength of the nipple and to a lesser extent at the first few bottom threads in the base of each electrode socket. FIG. 2 is an enlarged view of Section 30 in FIG. 1 showing the threaded area near the midlength of the nipple where failure of the joint usually occurs.

Figure 3:
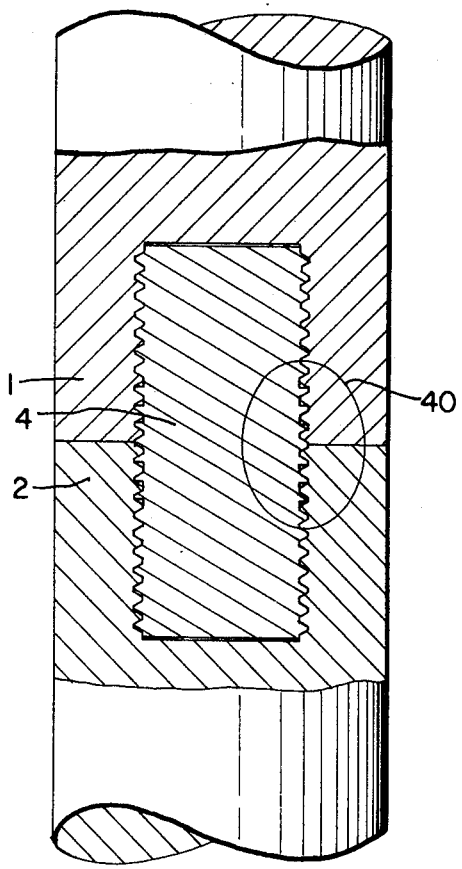
FIG. 3 is a vertical section view of a carbon electrode joint employing a nipple modified according to the invention.
Figure 4:
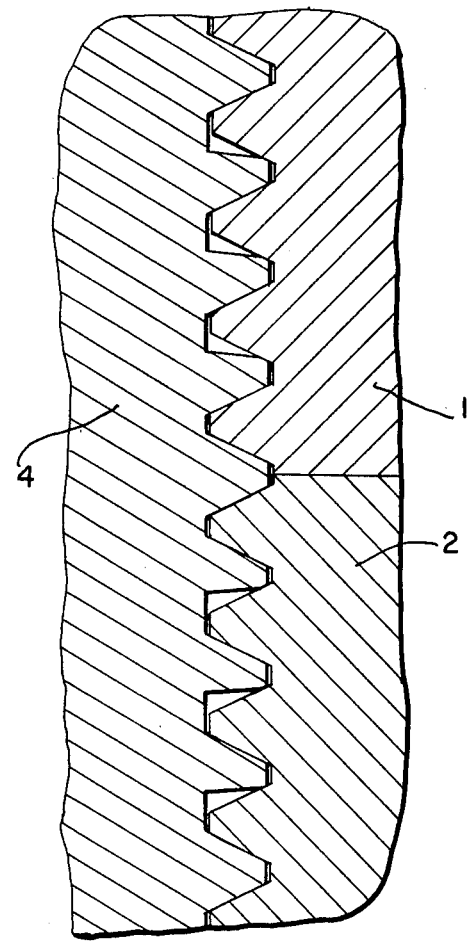
FIG. 4 is an enlarged view of Section 40 in FIG. 3.

A carbon electrode joint modified according to one embodiment of the invention is illustrated in FIG. 3 and comprises two coaxially aligned conventional carbon electrode sections 1 and 2, each electrode section having a threaded socket in its butt face, and a corresponding threaded nipple 4 joining the electrode sections in abutting relationship, wherein an effective amount of material has been removed from the non-load bearing flank of the first 3 threads on each side of the nipple's center thread sufficient to increase electrode joint strength. FIG. 4 is an enlarged view of Section 40 of FIG. 3 showing the modified nipple threads in detail.

Preferably, no more than about 45% of the total number of threads on a single side of the nipple's center thread are affected by removal of this material, and more preferably about 18% to about 37% of the total number of threads on a single side of the nipple's center thread are affected.

Figure 5:
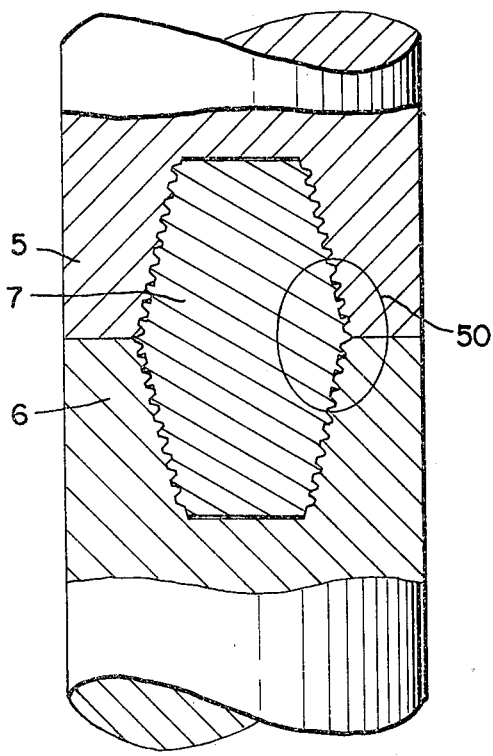
FIG. 5 is a vertical section view of a carbon electrode joint comprising a double tapered socket-nipple assembly employing a nipple modified according to the invention.
Figure 6:
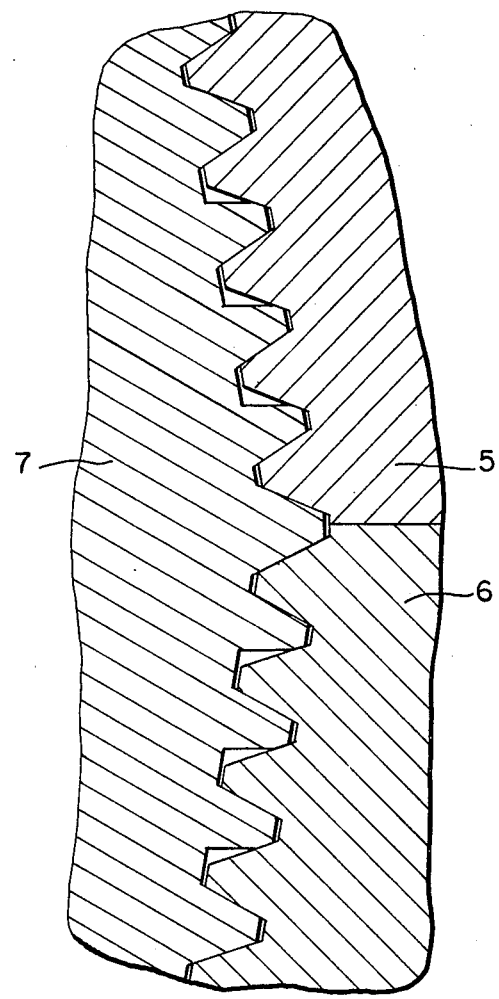
FIG. 6 is an enlarged view of Section 50 in FIG. 5.

The embodiment of the invention illustrated in FIG. 5 comprises two coaxially aligned carbon electrode sections 5 and 6, each electrode section having a tapered threaded socket in its butt face and a correspondingly tapered nipple 7 joining the electrode sections in abutting relationship, wherein an effective amount of material has been removed from the non-load bearing flank of the first 3 threads on each side of the nipple's center thread sufficient to increase electrode joint strength. FIG. 6 is an enlarged view of Section 50 of FIG. 5 showing the modified nipple threads in detail.

Figure 7:
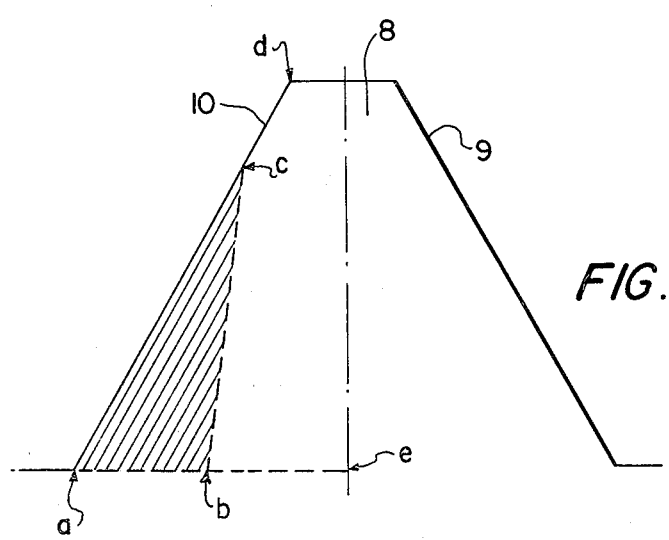
FIG. 7 illustrates a single nipple thread showing the means of modification thereof according to one embodiment of the invention.

The preferred embodiment of the invention is shown in FIG. 7 and comprises nipple thread 8 including load bearing flank 9 and non-load bearing flank 10 having edge a-d. Nipple thread 8 is modified according to one aspect of the invention by removal from non-load bearing flank 10 of thread material defined by two joined straight line segments consisting of a first straight line segment a-b extending along the base a-e of non-load bearing flank 10 from flank edge a-d a distance of about 0.11 inches to about 0.18 inches to termination point b, and a second straight line segment b-c extending from the termination point b of the first straight line segment a-b to edge a-d of non-load bearing flank 10, the second straight line segment b-c being perpendicular to the axis of the nipple. The thread material defined by line segments a-b and b-c, together with the segment a-c of edge a-d of non-load bearing flank 10 is the amount of material removed from thread 8 in this embodiment of the invention. For clarity, this area is shaded in the figure.

Further, the thread material removed from the nipple has the cross-sectional configuration of an obtuse triangle when viewed from the end thereof toward the non-load bearing flanks, the triangle having its apex at c and extending from the root diameter of the thread to a point about three-fourths of the distance to the crest of the thread, and is equal to about one-sixth of the cross-sectional area of the whole thread.

EXAMPLE

A-Standard Joint

A 3⅝ inch major diameter ×5½ inch, ¼ pitch (4 threads per inch) standard double tapered nipple having a taper of approximately 9° in relation to the axis thereof was utilized to connect two 6 inch diameter premium grade graphite electrode sections having correspondingly tapered threaded sockets in their butt faces, utilizing 250 ft.-lbs. torque. This relatively high torquing level was used to simulate under room temperature conditions the thermal stresses produced at the center of a nipple under conventional high temperature operating conditions.

The modulus of rupture (MOR), which is the amount of pressure required to cause failure of the electrode joint, and is a value well recognized in the art as useful in determining electrode joint strength, was then measured for this joint essentially according to the procedure and apparatus outlined in the American Society for Testing and Materials (ASTM) Method C651-70, "Flexural Strength of Manufactured Carbon and Graphite Articles Using Four-Point Loading at Room Temperature", the measuring instrument being an Instron Universal Testing Apparatus-Model TT-K.

B-Joints Of The Invention

Three nipples essentially identical to the nipple used in experiment A were placed in a lathe and centered, and the cutting tool was adjusted to remove thread material from the non-load bearing flanks of 2, 3 and 4 threads lying directly on each side of the center threads of the respective nipples, the material being removed in an amount defined by two joined line segments consisting of a first straight line segment extending along the base of the non-load bearing flank from the edge thereof a distance of 0.15 inches to a termination point, and a second straight line segment extending from the termination point of the first straight line segment to the edge of the non-load bearing flank, the second straight line segment being perpendicular to the nipple's axis. This thread modification affected about 18%, about 27%, and about 36%, respectively, of the total number of threads on each side of the nipple's center thread. Several nipples were fabricated by this method for each selected number of threads affected.

Each modified nipple was then utilized to connect two 6 inch diameter electrode sections essentially identical to the sections used in experiment A, using the same torque. The modulus of rupture (MOR) was determined for each of these joints according to the standard ASTM procedure.

Due to the dependence of the joint MOR on the strength of the electrode sections or nipple stock used to form the assembly, joint strength is conventionally expressed in the art as a percent of the MOR of the component where failure (breakage) is observed to occur (i.e., socket or nipple failure). The formula for calculating this value is:

Joint strength as % of Component $MOR =$ $$\frac{MOR \text{ (joint at failure)} \times 100}{MOR \text{ (component that failed)}}.$$

This expression essentially cancels the varied strengths of the electrode or nipple stock so that a direct comparison of joint strengths may be determined. The following table summarizes the results of the experiments discussed above.

JOINT STRENGTH AS A FUNCTION
OF NIPPLE MODIFICATION

| Threads Affected* | Joint Strength As %<br>Of Component MOR |
| --- | --- |
| None | 15.7 |
| 2 | 19.1 |
| 3 | 18.6 |
| 4 | 19.8 |

*Number of threads on each side of the nipple's center thread that was modified by removal of thread material from the nonload bearing flank.

As can be seen from the experimental data, an improvement in joint strength of 18–26% is provided by modifying a nipple according to the invention.

While the invention has been described in detail and with reference to the drawings and specific embodiments thereof, it will be apparent to one skilled in the art that various changes and modifications can be made therein without departing from the scope and spirit thereof, and, therefore, the invention is not intended to be limited except as indicated in the appended claims.

What is claimed is:

1. In a carbon electrode joint comprising two coaxially aligned electrode sections, each said electrode section having a threaded socket in its butt face, and a correspondingly threaded nipple joining said electrode sections in abutting relationship, the improvement which comprises having an effective amount of material removed from the non-load bearing flank of the first few threads on each side of the center thread of the nipple, the removed material having the cross-sectional configuration of an obtuse triangle extending from the root diameter of the thread to a point about three-fourths of the distance to the crest of the thread and being equal to about one-sixth of the cross-sectional area of the whole thread, the amount of removed material being sufficient to increase electrode joint strength, the number of threads on each side of the center thread of the nipple affected by removal of material being from about 18% to about 36% of the total number of threads on a single side of said nipple's center thread.

2. An electrode joint according to claim 1 wherein the threaded sockets of the electrode sections are tapered and wherein the portions of the nipple threaded into said sockets are correspondingly tapered.

3. A threaded nipple for joining the abutting ends of correspondingly threaded carbon electrode sections to form an electrode joint, said nipple having an effective amount of material removed from the non-load bearing flank of the first few threads on each side of the center thread of said nipple, the removed material having the cross-sectional configuration of an obtuse triangle extending from the root diameter of the thread to a point about three-fourths of the distance to the crest of the thread and being equal to about one-sixth of the cross-sectional area of the whole thread, the amount of removed material being sufficient to increase electrode joint strength, the number of threads on each side of the center thread of the nipple affected by removal of material being from about 18% to about 36% of the total number of threads on a single side of said nipple's center thread.

* * * * *